(12) United States Patent
Choi

(10) Patent No.: US 11,299,122 B2
(45) Date of Patent: Apr. 12, 2022

(54) AIRBAG APPARATUS

(71) Applicants: Hyundai Motor Company, Seoul (KR); Kia Motors Corporation, Seoul (KR)

(72) Inventor: Jun Yeol Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/061,138

(22) Filed: Oct. 1, 2020

(65) Prior Publication Data

US 2021/0387591 A1 Dec. 16, 2021

(30) Foreign Application Priority Data

Jun. 15, 2020 (KR) ........................ 10-2020-0072548

(51) Int. Cl.
*B60R 21/2338* (2011.01)
*B60R 21/239* (2006.01)
*B60R 21/26* (2011.01)
*B60R 21/015* (2006.01)
*B60R 21/01* (2006.01)
*B60R 21/00* (2006.01)

(52) U.S. Cl.
CPC .... *B60R 21/2338* (2013.01); *B60R 21/01512* (2014.10); *B60R 21/239* (2013.01); *B60R 21/26* (2013.01); *B60R 2021/0044* (2013.01); *B60R 2021/0048* (2013.01); *B60R 2021/0051* (2013.01); *B60R 2021/01238* (2013.01); *B60R 2021/23388* (2013.01)

(58) Field of Classification Search
CPC . B60R 21/231; B60R 21/2338; B60R 21/206; B60R 2021/23169
See application file for complete search history.

(56) References Cited

U.S. PATENT DOCUMENTS 3,768,830 A * 10/1973 Hass ..................... B60R 21/233
280/729
3,784,225 A * 1/1974 Fleck .................... B60R 21/231
280/729

(Continued)

FOREIGN PATENT DOCUMENTS

CN 111660991 A * 9/2020 ........... B60R 21/233
CN 112874465 A * 6/2021 ........... B60R 21/215

(Continued)

*Primary Examiner* — Nicole T Verley
(74) *Attorney, Agent, or Firm* — Morgan, Lewis & Bockius LLP

(57) ABSTRACT

An airbag apparatus may include an airbag module mounted at a lower end portion of a crash pad; an airbag cushion configured to deploy from the airbag module to deploy in a space between a knee portion and a head portion of a passenger, wherein a tether is connected to the airbag cushion in a deployment direction of the airbag cushion toward at least one of the knee portion, a chest portion, and the head portion of the passenger to form an integrated deployment shape of the airbag cushion; and a release device connected to the tether close to the airbag module, and operated to allow the tether to be released or maintained in a fixed state in a deployment process of the airbag cushion depending on a body shape of the passenger on a seat of the vehicle.

18 Claims, 16 Drawing Sheets

(56) References Cited

U.S. PATENT DOCUMENTS

| | | | | |
|---|---|---|---|---|
| 3,929,350 A * | 12/1975 | Pech | ................ | B60R 21/231 |
| | | | | 280/729 |
| 5,022,675 A * | 6/1991 | Zelenak, Jr | ........... | B60R 21/201 |
| | | | | 280/743.1 |
| 5,427,410 A * | 6/1995 | Shiota | ................ | B60R 21/231 |
| | | | | 280/729 |
| 5,513,877 A * | 5/1996 | MacBrien | ............ | B60R 21/233 |
| | | | | 280/732 |
| 7,131,664 B1 * | 11/2006 | Pang | ................ | B60R 21/2338 |
| | | | | 280/743.2 |
| 7,401,811 B2 * | 7/2008 | Nagai | ................ | B60R 21/239 |
| | | | | 280/731 |
| 7,556,288 B2 * | 7/2009 | Zauritz | ................ | B60R 21/232 |
| | | | | 280/729 |
| 7,571,932 B2 * | 8/2009 | Seo | ................ | B60R 21/26 |
| | | | | 280/742 |
| 7,661,701 B2 * | 2/2010 | Hirata | ................ | B60R 21/233 |
| | | | | 280/730.2 |
| 8,267,425 B2 * | 9/2012 | Chida | ................ | B60R 21/239 |
| | | | | 280/736 |
| 8,511,710 B2 * | 8/2013 | Fukawatase | ........... | B60R 21/205 |
| | | | | 280/743.1 |
| 8,622,417 B1 * | 1/2014 | Schneider | ........... | B60R 21/2338 |
| | | | | 280/729 |
| 8,882,141 B2 * | 11/2014 | Arnold | ................ | B60R 21/18 |
| | | | | 280/733 |
| 9,216,712 B1 * | 12/2015 | Kwon | ................ | B60R 21/239 |
| 9,283,920 B1 * | 3/2016 | Fischer | ................ | B60R 21/235 |
| 9,296,353 B1 * | 3/2016 | Choi | ................ | B60R 21/01554 |
| 9,296,358 B2 * | 3/2016 | Chen | ................ | B60R 21/205 |
| 9,352,839 B2 * | 5/2016 | Gehret | ............ | B64D 11/06205 |
| 9,446,733 B2 * | 9/2016 | Pausch | ................ | B60R 21/207 |
| 9,487,177 B2 | 11/2016 | Schneider et al. | | |
| 10,703,325 B2 * | 7/2020 | Schneider | ........... | B60R 21/2338 |
| 10,814,823 B2 * | 10/2020 | Jaradi | ................ | B60R 21/207 |
| 10,829,076 B2 * | 11/2020 | Takahashi | ........... | B60R 21/21 |
| 10,857,965 B2 * | 12/2020 | Abe | ................ | B60R 21/214 |
| 2002/0125708 A1 * | 9/2002 | Schneider | ........... | B60R 21/215 |
| | | | | 280/753 |
| 2003/0107206 A1 * | 6/2003 | Takimoto | ............ | B60R 21/206 |
| | | | | 280/730.1 |
| 2004/0124617 A1 * | 7/2004 | Morita | ................ | B60R 21/2165 |
| | | | | 280/732 |
| 2004/0174003 A1 * | 9/2004 | Dominissini | ......... | B60R 21/233 |
| | | | | 280/729 |
| 2005/0023805 A1 * | 2/2005 | Kai | ................ | B60R 21/216 |
| | | | | 280/728.3 |
| 2005/0062265 A1 * | 3/2005 | Hotta | ................ | B60R 21/206 |
| | | | | 280/730.1 |
| 2008/0079245 A1 * | 4/2008 | Bito | ................ | B60R 21/206 |
| | | | | 280/730.1 |
| 2008/0174091 A1 * | 7/2008 | Hoshino | ............... | B60R 21/206 |
| | | | | 280/728.3 |
| 2009/0079170 A1 * | 3/2009 | Bito | ................ | B60R 7/06 |
| | | | | 280/730.1 |
| 2010/0052296 A1 * | 3/2010 | Sasaki | ................ | B60R 21/2176 |
| | | | | 280/730.1 |
| 2010/0102542 A1 | 4/2010 | Nakajima et al. | | |
| 2011/0031723 A1 * | 2/2011 | Fischer | ................ | B60R 21/235 |
| | | | | 280/730.1 |
| 2011/0285114 A1 * | 11/2011 | Ohara | ................ | B60R 21/2346 |
| | | | | 280/730.1 |
| 2018/0134244 A1 * | 5/2018 | Choi | ................ | B60R 21/2338 |
| 2018/0281733 A1 * | 10/2018 | Shigemura | ............ | B60R 21/206 |
| 2018/0281735 A1 * | 10/2018 | Shigemura | ............ | B60R 21/206 |
| 2018/0290615 A1 * | 10/2018 | Humbert | .......... | B64D 11/06205 |
| 2019/0092270 A1 * | 3/2019 | Song | ................ | B60R 21/207 |
| 2019/0106073 A1 * | 4/2019 | Sundararajan | ........ | B60R 21/214 |
| 2019/0375364 A1 * | 12/2019 | Tanaka | ................ | B60R 21/2338 |
| 2019/0389421 A1 * | 12/2019 | Sturm | ................ | B60R 21/233 |
| 2020/0094770 A1 * | 3/2020 | Fischer | ................ | B60R 21/231 |
| 2020/0122678 A1 * | 4/2020 | Tanaka | ............. | B60R 21/01512 |
| 2020/0339058 A1 * | 10/2020 | Jaradi | ................ | B60R 21/231 |
| 2020/0339059 A1 * | 10/2020 | Kobayashi | ............ | B60R 21/231 |
| 2021/0094499 A1 * | 4/2021 | Deng | ................ | B60R 21/01554 |
| 2021/0221315 A1 * | 7/2021 | Deng | ................ | B60N 2/68 |
| 2021/0229616 A1 * | 7/2021 | Shrivatri | ............ | B60R 21/206 |

FOREIGN PATENT DOCUMENTS

| | | | | |
|---|---|---|---|---|
| DE | 102018130026 A1 * | 5/2019 | ........... | B60R 21/214 |
| EP | 1327564 A2 * | 7/2003 | ........... | B60R 21/206 |
| EP | 3470273 A1 * | 4/2019 | ........ | B60R 21/2338 |
| EP | 3792119 A1 * | 3/2021 | ........... | B60R 21/207 |
| JP | 2004345530 A * | 12/2004 | ........... | B60R 21/206 |
| JP | 2011-051549 A | 3/2011 | | |
| JP | 2019059381 A * | 4/2019 | ........... | B60R 21/231 |
| JP | 6536963 B2 * | 7/2019 | ........... | B60R 21/239 |
| JP | 2019-214352 A | 12/2019 | | |
| KR | 101063389 B1 * | 9/2011 | ........... | B60R 21/233 |
| KR | 101620174 B1 * | 5/2016 | ........... | B60R 21/237 |
| WO | WO-2010050009 A1 * | 5/2010 | ........... | B60R 21/201 |
| WO | WO-2018037110 A1 * | 3/2018 | ........... | B60R 21/207 |

* cited by examiner

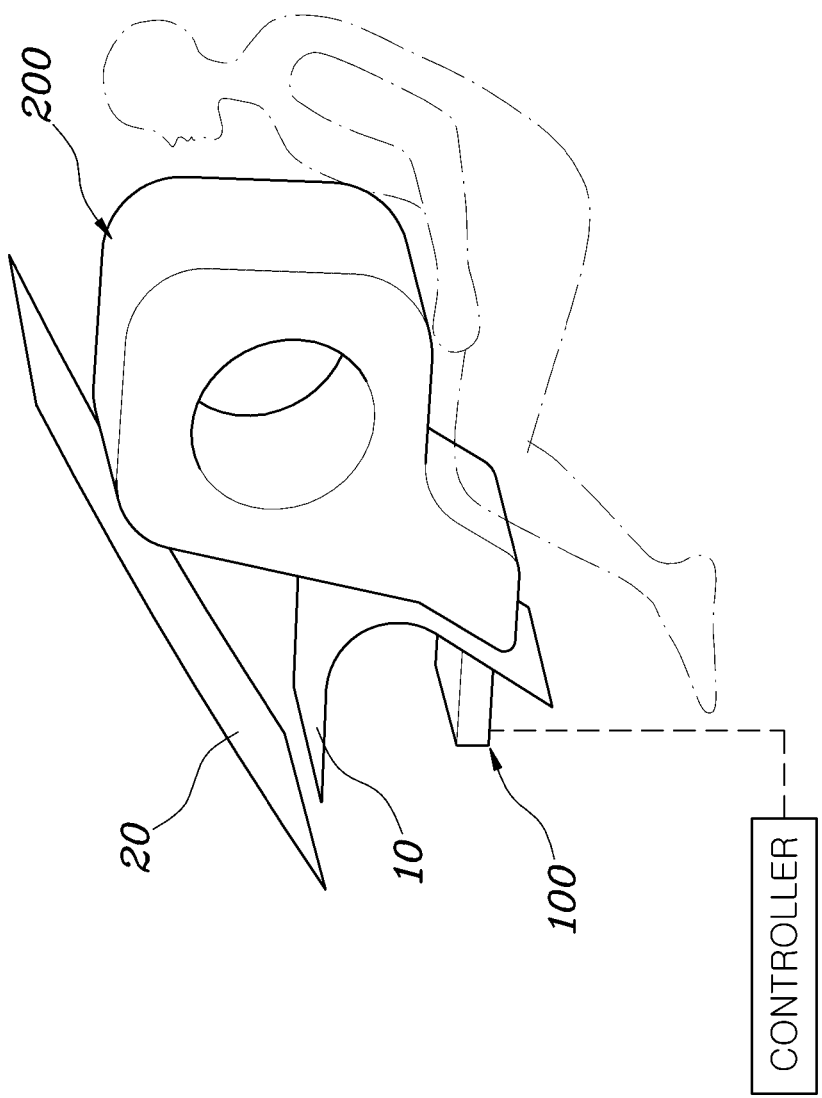

AIRBAG APPARATUS

CROSS REFERENCE TO RELATED APPLICATION

The present application claims priority to Korean Patent Application No. 10-2020-0072548 filed on Jun. 15, 2020, the entire contents of which is incorporated herein for all purposes by this reference.

BACKGROUND OF THE INVENTION

Field of the Invention

The present invention relates to an airbag apparatus capable of safely protecting a passenger in a response to the slimming design of a crash pad.

Description of Related Art

Airbags reduce or prevent injury by absorbing the shock of a passenger due to appropriate expanding of an airbag cushion when a vehicle accident occurs, and the expanding of the airbag cushion plays an important role in securing the safety of the passenger.

That is, the passenger may be rapidly restrained by rapid expansion at the initial deployment of the airbag cushion, and the shock of the passenger may be appropriately absorbed by properly discharging expansion gas in the airbag cushion when the passenger starts to be in contact with the airbag cushion such that the weight of the airbag cushion is applied to the passenger.

Furthermore, requirements in various regulations such as a low risk deployment (LRD) regulation may be satisfied. The LRD regulation requires to discharge expansion gas through a vent hole even at the initial deployment stage of the airbag cushion for minimizing injury to a child or a passenger located near the airbag apparatus.

Meanwhile, recently, a crash pad tends to be designed in a slim shape, as one of the ways to increase the utilization of an internal space of a vehicle.

However, as the crash pad becomes slimmer, a space for mounting the passenger airbag becomes narrower such that it is difficult to mount the airbag.

Furthermore, as the height of the crash pad is lowered and the distance between the crash pad and the passenger is increased, an airbag protection area for protecting the passenger becomes wider. Therefore, an airbag apparatus is required to properly respond to the slim crash pad design.

The above-described Description of Related Arts are only for enhancing understanding of the background of the present invention, and may not be interpreted by a person having ordinary skill in the art that they form related art.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an airbag apparatus configured for safely protecting a passenger in a response to the slimming design of the crash pad.

To achieve the purpose described above, an airbag apparatus is provided, the airbag apparatus including: an airbag module mounted at a lower end portion of a crash pad; an airbag cushion configured to deploy from the airbag module to deploy in a space between a knee portion and a head portion of a passenger, wherein a tether is connected to the airbag cushion in a deployment direction of the airbag cushion toward at least one of the knee portion, a chest portion, and the head portion of the passenger to form an integrated deployment shape; and a release device connected to the tether close to the airbag module, and operated to allow the tether to be released or maintained in a fixed state in a deployment process of the airbag cushion depending on a body shape of the passenger on a seat of the vehicle.

A hollow portion may be formed at a middle portion of the airbag cushion in left and right directions.

An upper body protection portion of the airbag cushion may be deployed in an annular shape enclosing the hollow portion, and a lower body protection portion of the airbag cushion may be deployed downwardly from a front end portion of the upper body protection portion.

The tether may comprise: a first tether connected between the release device and the hollow portion toward the head portion of the passenger; a second tether connected in the hollow portion toward the chest portion of the passenger; and a third tether connected in the lower body protection portion toward the knee portion of the passenger.

The first tether may have a first end portion connected to the release device, a middle portion penetrating a lower end portion of the hollow portion and crossing an interior of the airbag cushion, and a second end portion crossing the hollow portion to be connected to an internal surface of an upper end portion of the hollow portion.

The second tether may have first and second end portions connected to internal surfaces of front and rear end portions of the hollow portion, respectively.

The third tether may have a first end portion connected to a lower end portion of the first tether and a second end portion connected to an internal surface of a rear of the lower body protection portion.

A vent chamber may be provided in the airbag cushion in a shape surrounding the first tether.

Upper and lower vent holes may be respectively formed at upper and lower end portions of the vent chamber to allow the first tether to penetrate the vent chamber, and a cross-sectional area of the first end portion of the first tether may be greater than a cross-sectional area of the lower vent hole such that the first end portion of the first tether is hung on the lower vent hole while the first tether is released.

A diffuser having a lateral distance longer than a lateral distance of the lower vent hole may be connected between the first end portion of the first tether and the release device such that the diffuser may be hung on the lower vent hole while the first tether is released.

The first tether may penetrate the lower end portion of the hollow portion.

The upper end portion of the vent chamber may be sewn to the lower end portion of the hollow portion through which the first tether is provided to penetrate such that the upper vent hole may communicates with an interior of the hollow portion.

The lower end portion of the vent chamber may be sewn to an internal surface of the airbag cushion such that the lower vent hole may communicate with the interior of the airbag cushion.

A plurality of through holes may be formed on the third tether.

The first tether may have a first end portion connected to the release device, a middle portion penetrating and fixed to a lower end portion of the hollow portion and crossing an interior of the airbag cushion, and a second end portion crossing the hollow portion to be connected to an internal surface of an upper end portion of the hollow portion.

The second tether may have first and second end portions connected to the internal surfaces of front and rear end portions of the hollow portion, respectively.

The third tether may have a first end portion connected to a lower end portion of the first tether and a second end portion connected to an internal surface of a rear of the lower body protection portion.

A diffuser may be connected between the first end portion of the first tether and the release device.

The first tether may have a first end portion connected to the release device, a middle portion disposed inside the hollow portion by penetrating the upper body protection portion, and a second end portion crossing the hollow portion to be connected to an internal surface of an upper end portion of the hollow portion.

The second tether may have first and second end portions connected to internal surfaces of front and rear end portions of the hollow portion, respectively.

The third tether may have a first end portion connected to the release device and a second end portion connected to an internal surface of a rear of the lower body protection portion.

A penetration chamber may be provided in the upper body protection portion in a shape surrounding the first tether.

An upper end portion of the penetration chamber may be sewn to a lower end portion of the hollow portion through which the first tether is provided to penetrate.

A lower end portion of the penetration chamber may be sewn to a lower end portion of the upper body protection portion through which the first tether is provided to penetrate.

The tether vent hole may be positioned in front of a gas discharging direction of an inflator of the airbag cushion.

A string-shaped connection cord may be connected between the first tether and the release device and between the third tether and the release device.

The airbag module may further comprise: an airbag housing provided inside the lower end portion of the crash pad and having an end portion open toward the crash pad; an inflator provided inside the airbag housing and configured to inject gas into the airbag cushion; and an airbag door having a first end portion inserted and mounted in an airbag mounting hole formed on the lower end portion of the crash pad and a second end portion mounted to cover the open end portion of the airbag housing.

The airbag module may further comprise: a controller configured to determine the body shape of the passenger on the seat and to control the release device to selectively operate depending on the body shape of the passenger when the airbag cushion is deployed in a response to collision of a vehicle.

As described above, according to various exemplary embodiments of the present invention, a tether is released or maintained in a fixed state according to the body shape or seating position of a passenger in a slim crash pad design, rapidly restraining the passenger by changing the deployment shape of an airbag cushion and increasing a passenger protection area, and thus, safely protecting the passenger.

Furthermore, the initial deployment pressure of the airbag cushion is reduced by controlling the diffuser structure and the release time point of the tether, improving the LRD performance. Moreover, manufacturing costs and weight of the airbag module may be reduced and the package of the airbag module may be reduced by performing a function simultaneously protecting head, chest, and knee portions of the passenger using one integrated airbag module.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1A and FIG. 1B are views showing a deployment shape of an airbag cushion according to the body shape of a passenger in various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention will be described in detail with reference to the accompanying drawings.

An airbag apparatus according to various exemplary embodiments of the present invention is an airbag apparatus applicable to a passenger seat of a vehicle, and may be mounted at a lower portion of a crash pad 10 mounted at a front portion of the passenger seat and the airbag apparatus includes an airbag module 100, an airbag cushion 200, and a release device 300.

Figure 1A:
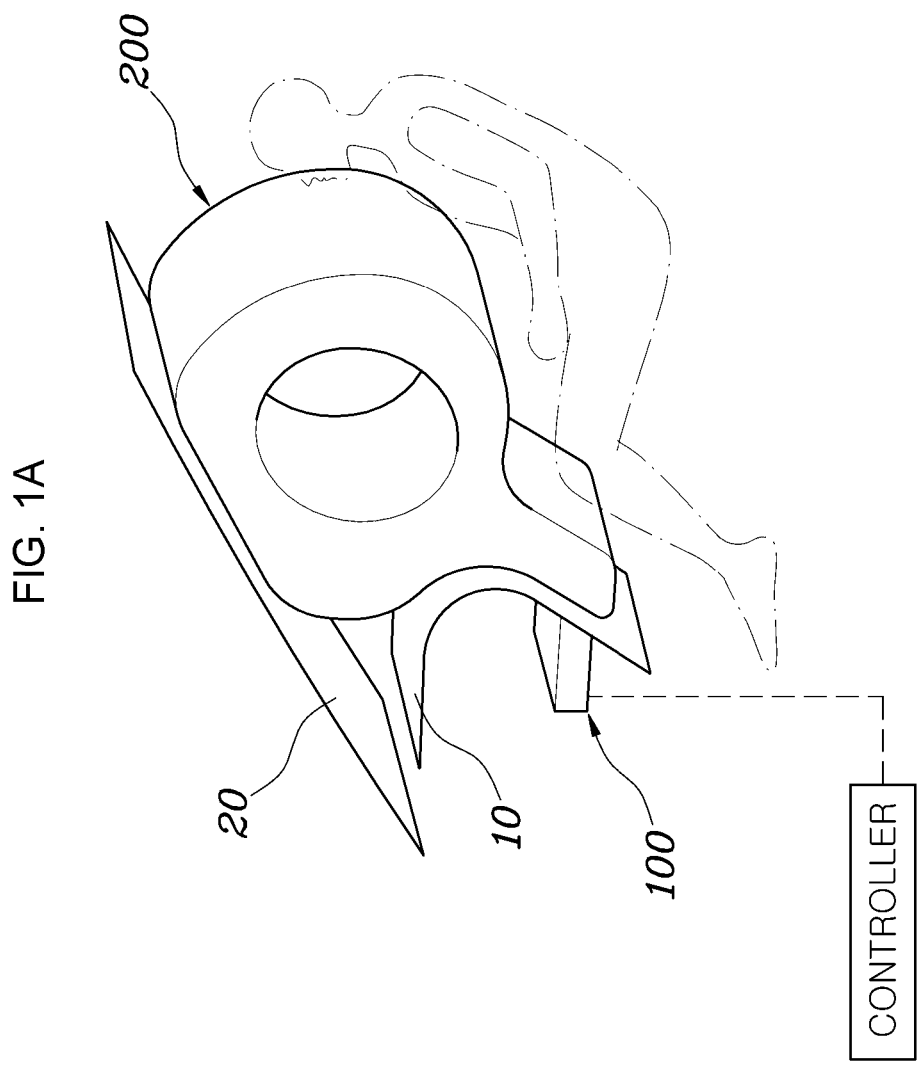

Referring to FIG. 1A and FIG. 1B, the airbag apparatus includes: an airbag module 100 mounted at a lower end portion of a crash pad 10; an airbag cushion 200 configured to deploy from the airbag module 100 to deploy in a space between a knee portion and a head portion of a passenger, wherein a tether may be connected to the airbag cushion 100 in a deployment direction of the airbag cushion 100 toward at least one of the knee portion, a chest portion, and the head portion of the passenger to form an integrated deployment shape; and a release device 300 connected to the tether close to the airbag module 100, and operated to allow the tether to be released or maintained in a fixed state in a deployment process of the airbag cushion 200 depending on a body shape of the passenger on a seat of the vehicle.

That is, as the crash pad 10 becomes slimmer, the internal space of the upper end portion of the crash pad 10 becomes narrower, so that it is difficult to install the airbag module 100.

Therefore, according to various exemplary embodiments of the present invention, the mounting position of the airbag module 100 is changed to the lower end portion of the crash pad 10 where a relatively large space is available such that the airbag module 100 may be mounted in a slim design environment of the crash pad 10.

Furthermore, as the distance between the crash pad 10 and the passenger becomes longer due to the slim crash pad 10, a larger passenger protection area is required to be protected by the airbag.

Accordingly, according to various exemplary embodiments of the present invention, the airbag cushion 200 is deployed toward knee, chest, and head portions of the passenger and the tether is connected toward each of the knee, chest, and head portions of the passenger, safely protecting the upper body and the lower body of the passenger with a single airbag.

As described above, manufacturing costs and weight of the airbag module 100 may be reduced and the package of the airbag module 100 may be reduced by performing simultaneously protecting head, chest, and knee portions of the passenger using a single integrated airbag module 100.

When the airbag cushion 200 is deployed, the tether may be released or maintained in a fixed state depending on the body shape of the passenger such that the deployment shape of the airbag cushion 200 may be changed depending on the body shape of the passenger.

For example, FIG. 1A shows the deployment shape of the airbag cushion 200 when 5% of an adult female passenger is positioned on a seat, in which the body of the passenger is positioned at a relatively front side thereof.

In the instant case, the tether is not released so that each tether connected in the direction of the head, chest, and knee portions of the passenger holds the deployment shape of the airbag cushion 200, the rear end portion position of the deployed airbag cushion 200 is positioned at a relatively front side, and thus, it is possible to optimally protect the passenger approaching the front side thereof.

Furthermore, the overlap between windshield glass 20 and the airbag cushion 200 is increased to improve the early restraint of the passenger.

Meanwhile, FIG. 1B shows the deployment shape of the airbag cushion 200 when an adult male passenger having an average body shape is positioned on a seat, in which the body of the passenger is positioned at a relatively rear side thereof.

In the instant case, the tether is released by the release device 300, so that gas is uniformly distributed in the airbag cushion 200 and the rear end portion of the airbag cushion 200 is positioned at a relatively rear side, and thus the passenger may be safely protected by increasing not only a lower body protection area including the passenger's knee located at the rear but also an upper body protection area including the head and chest parts.

However, in the case of the LRD condition, a tether release time point is set to be later than a predetermined time period (about 20 ms) after the airbag is ignited, so that the initial deployment pressure of the airbag cushion 200 may be reduced to satisfy the LRD performance.

Meanwhile, according to various exemplary embodiments of the present invention, a hollow shape may be formed at a middle portion of the airbag cushion 200 in a deployment shape.

In detail, a circular hollow portion 210 may be formed in the left and right axial directions in the middle portion of the airbag cushion 200. Furthermore, an upper body protection portion 200a may be deployed at an upper portion of the airbag cushion 200 in an annular shape surrounding the hollow portion 210, and a lower body protection portion 200b may be deployed at a lower portion of the airbag cushion 200 from a front end portion of the upper body protection portion 200a toward a lower side thereof.

That is, the hollow shape is applied to the middle portion of the airbag cushion 200 such that the volume in the airbag is reduced, preventing injury due to the airbag deployment pressure when the airbag is initially deployed and improving the LRD performance.

Furthermore, the head and chest portions of the passenger may be protected by the upper body protection portion 200a having the hollow portion 210, and the knee portion of the passenger may be protected by the lower body protection portion 200b integrally deployed with the lower portion of the upper body protection portion 200a, increasing the protection area of the airbag and safely protecting the passenger.

Meanwhile, the tether of the present invention may include a first tether 220, a second tether 230, and a third tether 240.

First, the first tether 220 may be connected between the release device 300 and the hollow portion 210 in a direction to the head portion of the passenger. The first tether 220 is configured to control the shape of the upper body protection portion 200a of the airbag cushion 200 by being released or fixed depending on the body shape of the passenger while forming the deployment shape of the upper body protection portion 200a toward the head portion of the passenger.

The second tether 230 may be connected in the hollow portion 210 in a direction to the chest portion of the passenger. The second tether 230 forms a deployment shape of the upper body protection portion 200a toward the chest portion of the passenger.

The third tether 240 may be connected in the lower body protection portion 200b in a direction to the knee portion of the passenger. The third tether 240 is configured to control the shape of the lower body protection portion 200b of the airbag cushion 200 by being released or fixed depending on the body shape of the passenger while forming the deployment shape of the lower body protection portion 200b toward the knee portion of the passenger.

Figure 2:
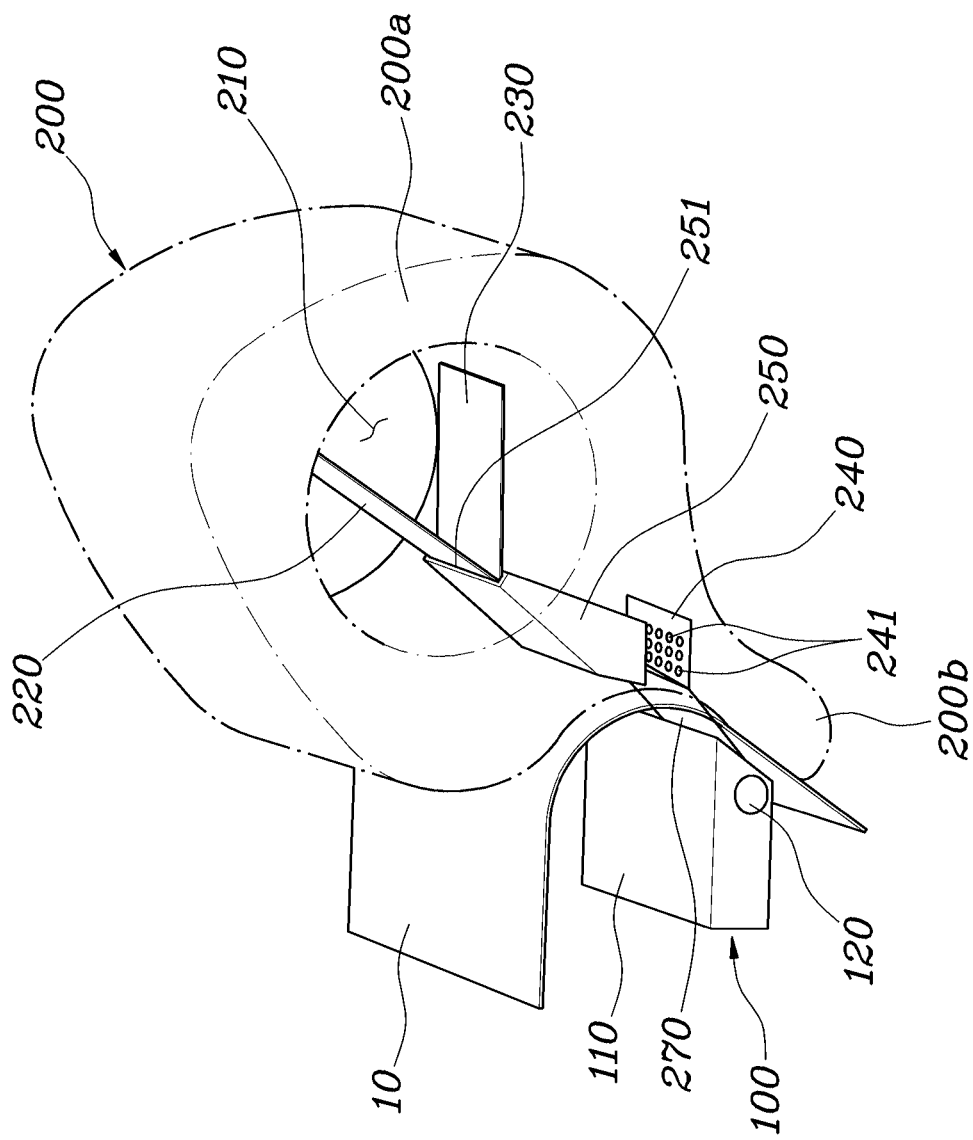
FIG. 2 is a view showing a configuration of various exemplary embodiments of a tether connection structure for deploying an airbag cushion of the present invention.
Figure 3:
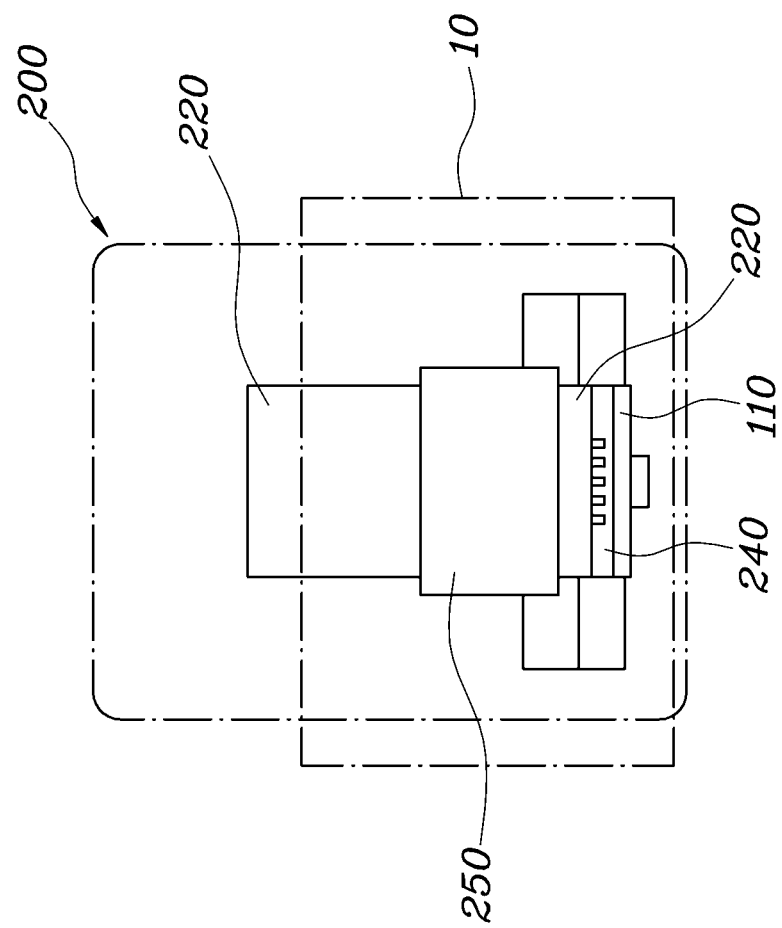
FIG. 3 is a view showing a shape in which the airbag apparatus of FIG. 2 is viewed from a passenger side thereof.

FIG. 2 is a view showing a configuration of various exemplary embodiments of a tether connection structure for deploying the airbag cushion 200 of the present invention, and FIG. 3 is a view showing a shape in which the airbag apparatus of FIG. 2 is viewed at a passenger side thereof. For reference, FIG. 2 shows a shape in which the airbag cushion 200 is deployed in a state in which the tether is fixed.

Referring to the drawings, according to the configuration of the various exemplary embodiments of the present invention, the first tether 220 has a first end portion connected to the release device 300, a middle portion penetrating the internal surface of the lower end portion of the hollow portion 210 and crossing the interior of the airbag cushion 200, and a second end portion crossing the hollow portion 210 and connected to the internal surface of the upper end portion of the hollow portion 210.

For example, the first tether 220 connected to the release device 300 may penetrate the internal surface of the lower end portion of the hollow portion 210 while crossing the interior of the lower body protection portion 200b of the lower portion of the airbag cushion 200 and the interior of the upper body protection portion 200a connected to the lower body protection portion 200b, and the first tether 220 penetrating the lower end portion of the hollow portion 210 may be sewn to the internal surface of the upper end portion of the hollow portion 210 while crossing obliquely in a direction toward the head portion of the passenger in the hollow portion 210.

For example, the first tether 220, the second tether 230, and the third tether 240 may be formed in a strip-shape, and may be connected to the internal surface of the airbag cushion 200 or other connection portions by sewing.

First and second end portions of the second tether 230 may be connected to internal surfaces of front and rear end portions of the hollow portion 210, respectively.

That is, the first end portion of the second tether 230 may be sewn to the internal surface of the front end portion of the hollow portion 210, and the second end portion of the second tether 230 may be sewn to the internal surface of the rear end portion of the hollow portion 210 while being nearly horizontally connected in a direction toward the chest portion of the passenger.

Furthermore, the third tether 240 may have a first end portion connected to the lower end portion of the first tether 220 and a second end portion connected to the internal surface of the rear of the lower body protection portion 200b.

For example, the first end portion of the third tether 240 may be sewn to the portion where the first tether 220 and the diffuser 270 are connected, and the second end portion of the third tether 240 may be sewn to the internal surface of the lower body protection portion 200b while being nearly horizontally connected in a direction toward the knee portion of the passenger.

Figure 4:
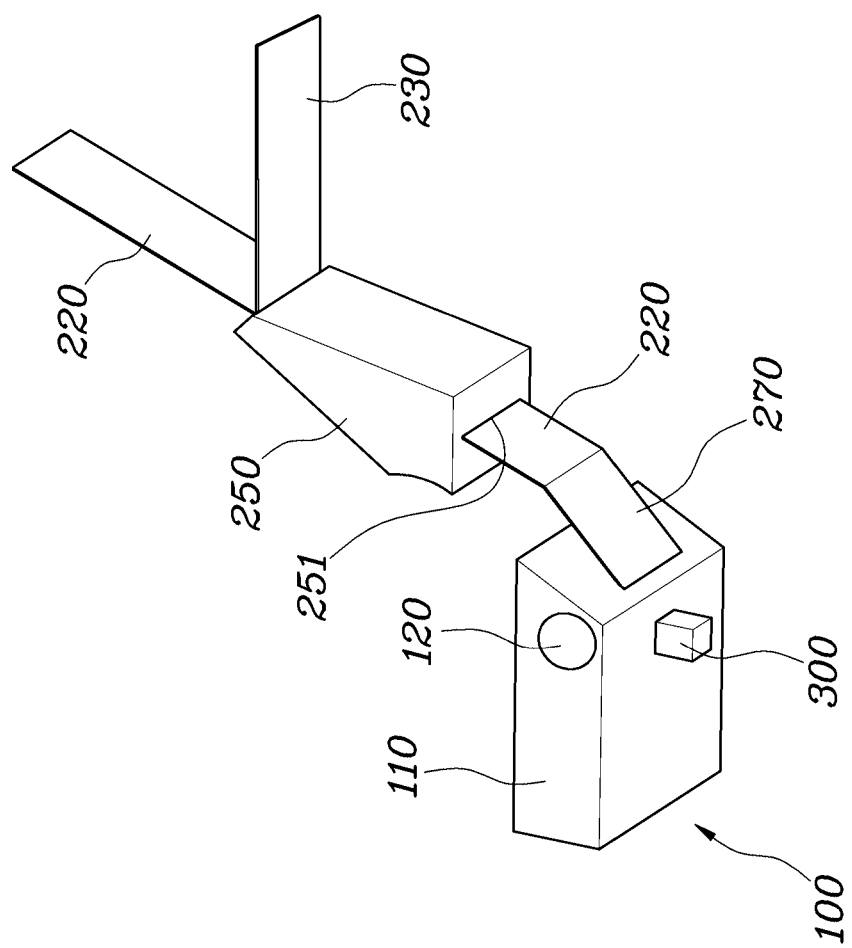
FIG. 4 is a view showing the configuration of the tether connection structure and the vent chamber illustrated in FIG. 2.
Figure 5:
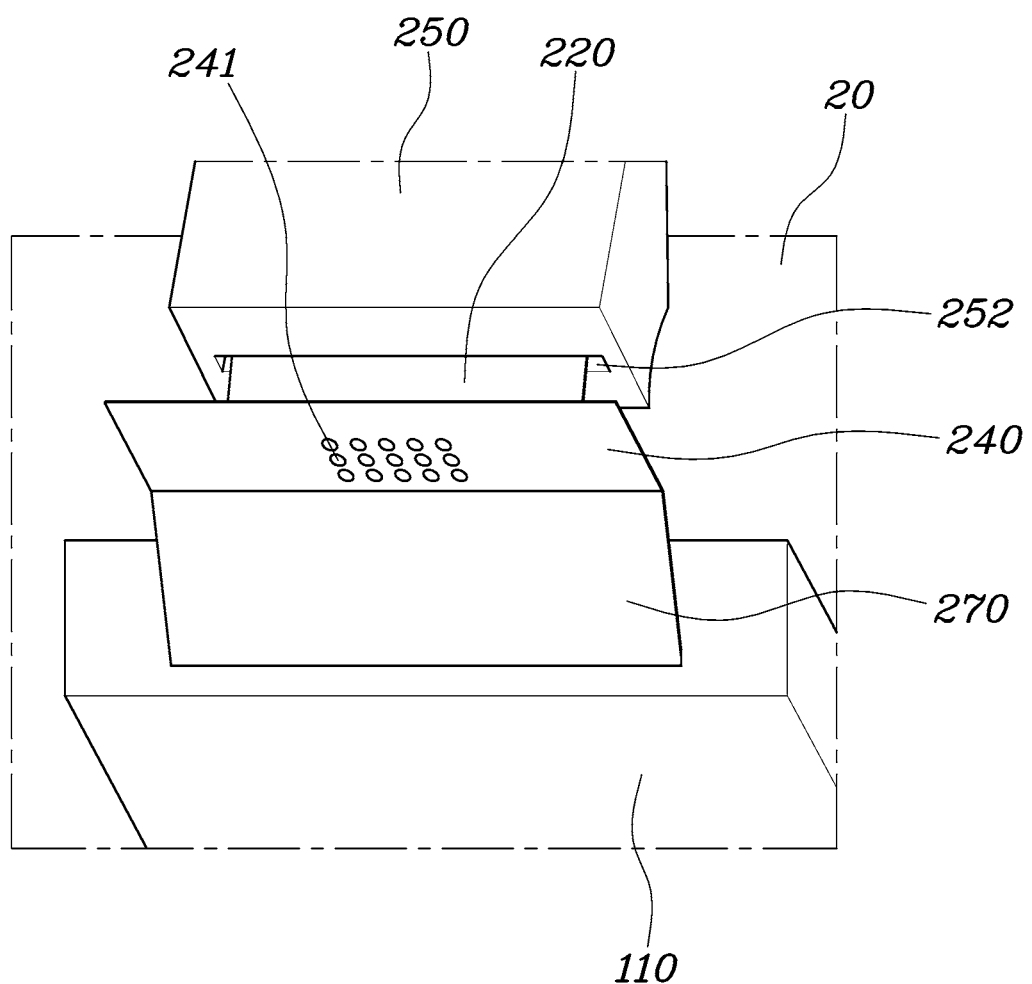
FIG. 5 is a view showing a structure in which a tether is hung on a vent hole formed in the vent chamber of FIG. 4.

Furthermore, FIG. 4 is a view showing the configuration of the tether connection structure and a vent chamber 250 illustrated in of FIG. 2, and FIG. 5 is a view showing a structure in which a tether is hung on a vent hole 252 formed in the vent chamber 250 of FIG. 4.

Referring to the drawings, a vent chamber 250 in a shape surrounding the first tether 220 may be provided in the airbag cushion 200, and upper and lower vent holes 251 and 252 may be respectively formed at the upper and lower end portions of the vent chamber 250 so that the first tether 220 is provided to penetrate the vent chamber 250.

That is, the vent chamber 250 may be provided inside the upper body protection portion 200a located between the hollow portion 210 and the lower body protection portion 200b, and as the first tether 220 is provided to penetrate the vent chamber 250 through the upper and lower vent holes 251 and 252, the interior of the vent chamber 250 may become a moving path of the first tether 220.

Furthermore, the cross-sectional area of the first end portion of the first tether 220 may be greater than that the cross-sectional area of the vent hole 252 formed on the vent chamber 250, so that the first end portion of the first tether 220 is hung on the vent hole 252.

For example, a rectangular strip-shaped diffuser 270 having a lateral distance longer than a lateral distance of the vent hole 252 may be connected between the first end portion of the first tether 220 and the release device 300, so that the cross-sectional area of the first end portion of the first tether 220 is greater than that the cross-sectional area of the vent hole 252.

Figure 6:
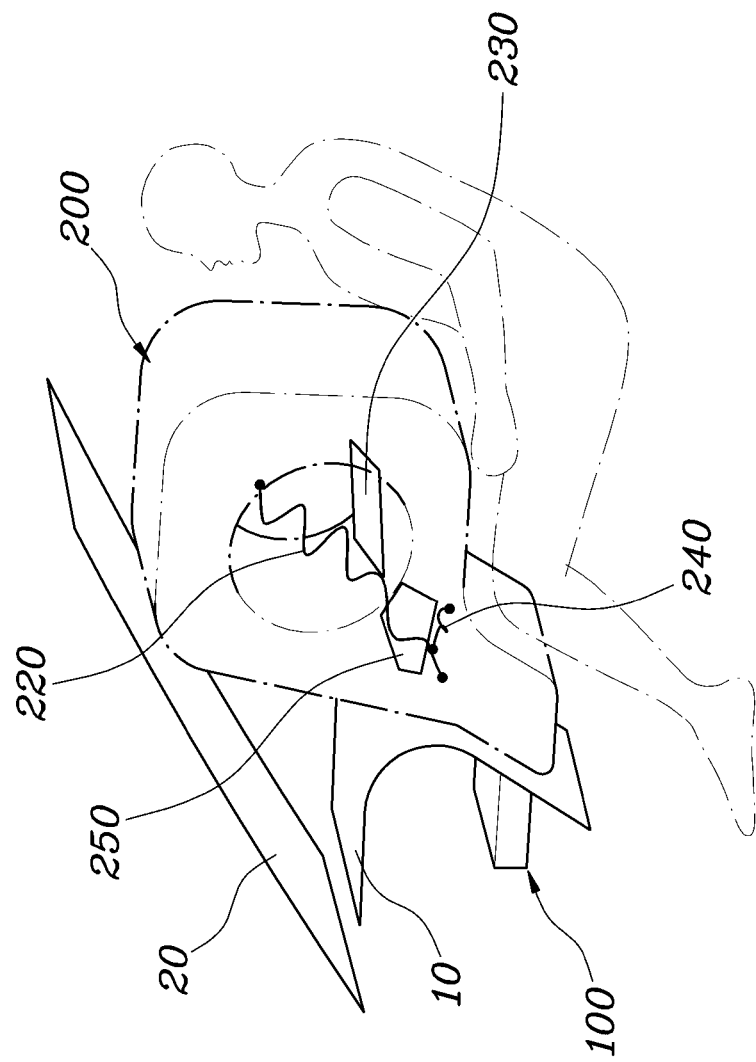
FIG. 6 is a view showing an operation in which a tether is released and deployed when the airbag cushion of FIG. 2 is deployed.

That is, when the first tether 220 is released depending on the body shape of the passenger, as shown in FIG. 6, the first tether 220 is loosened, and a force of pulling the first tether 220 from the hollow portion 210 is applied by the deployment pressure of the airbag cushion 200 such that the first end portion of the first tether 220 blocks the lower vent hole 252, and thus, the deployment shape of the airbag cushion 200 may be formed to be relatively large by preventing the loss of gas filled in the airbag cushion 200.

Furthermore, according to various exemplary embodiments of the present invention, the first tether 220 may be provided to penetrate the lower end portion of the hollow portion 210.

The upper end portion of the vent chamber 250 may be sewn to the lower end portion of the hollow portion 210 through which the first tether 220 is provided to penetrate, so that the upper vent hole 251 communicates with the interior of the hollow portion 210, and the lower end portion of the vent chamber 250 is sewn to the internal surface of the airbag cushion 200, so that the lower vent hole 252 communicates with the interior of the airbag cushion 200.

That is, when the first tether 220 is not released depending on the body shape of the passenger, the first tether 220 may be maintained in a fixed and tightened state as shown in FIG. 2, and the first tether 220 may not block the lower vent hole 252 such that the gas inside the airbag cushion 200 is discharged from the lower vent hole 252 to the outside through the upper vent hole 251, and thus, the deployment shape of the airbag cushion 200 may be formed to be relatively small.

At the present time, as the gas discharged from the inflator 120 collides with the middle portion of the diffuser 270, the gas may flow along the diffuser 270 such that an amount of gas flowing at the upper portion is greater than an amount of gas flowing at the lower portion of the airbag cushion 200 such that the upper portion of the airbag cushion 200 is deployed before the lower portion thereof, and thus, the upward deployment speed of the airbag cushion 200 is increased at the initial stage of the airbag deployment, safely protecting the human body of an adult passenger having a small body shape.

Furthermore, referring to FIG. 2, a first end portion of the second tether 230 may be sewn adjacent to the point where the first tether 220 is provided to penetrate the hollow portion 210, and a second end portion of the second tether 230 may be sewn to the internal surface of the rear end portion of the hollow portion 210.

For example, the first end portion of the second tether 230 may be sewn to the internal surface of the hollow portion 210 through which the first tether 220 is provided to penetrate, and the second end portion of the second tether 230 may be sewn to the internal surface of the rear end portion of the hollow portion 210, maintaining the shape of the upper body protector 200a which is deployed toward the chest portion of the passenger.

Furthermore, a plurality of through holes 241 may be formed on the third tether 240.

Accordingly, when the first tether 220 is not released, some of the gas flowing from the upper body protection portion 200a toward the lower body protection portion 200b may flow in through the through holes 241, and thus the deployment shape of the lower body protection portion 200b may be controlled to adjust the knee protection area of the passenger.

Figure 7:
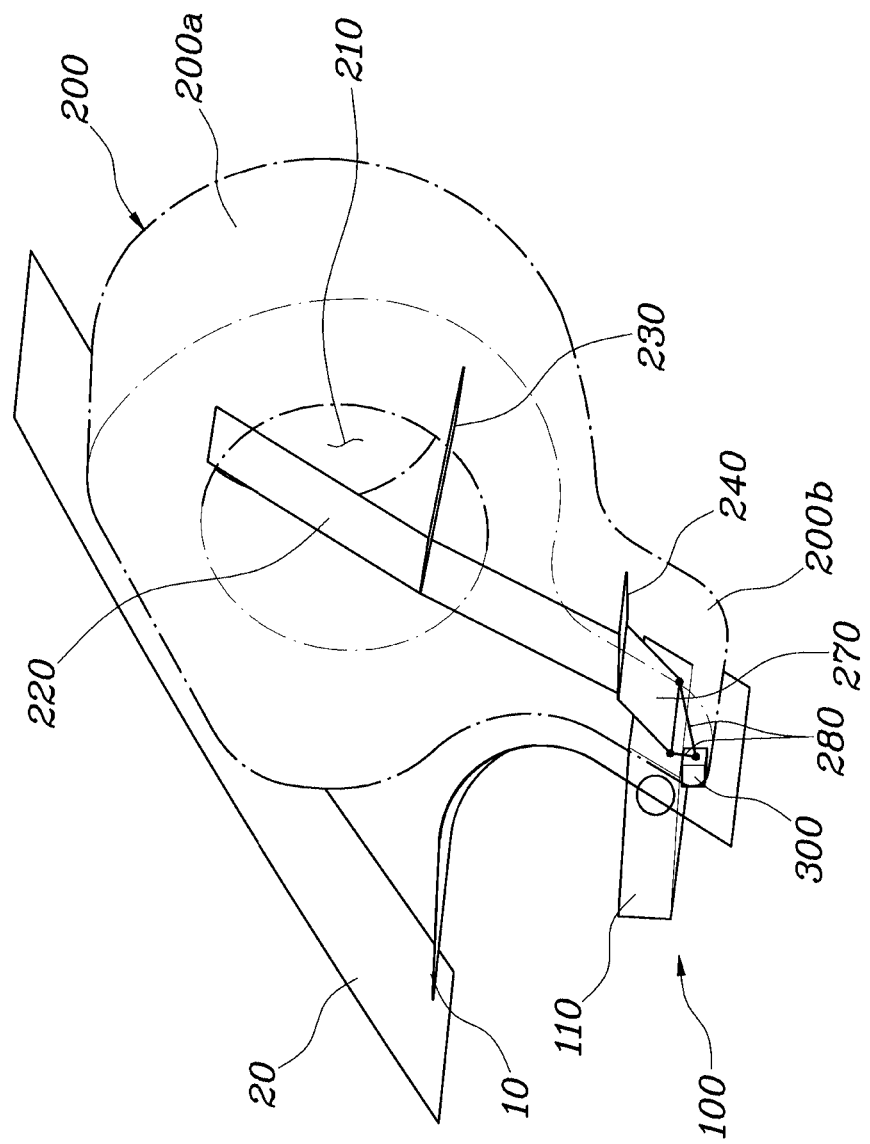
FIG. 7 is a view showing a configuration of various exemplary embodiments of the tether connection structure for deploying an airbag cushion of the present invention.

Meanwhile, FIG. 7 is a view showing a configuration of various exemplary embodiments of a tether connection structure for deploying the airbag cushion 200 of the present invention.

Referring to the drawings, according to the configuration of the various exemplary embodiments of the present invention, the first tether 220 has a first end portion connected to the release device 300, a middle portion penetrating and fixed to the lower end portion of the hollow portion 210 and crossing the interior of the airbag cushion 200, and a second end portion crossing the hollow portion 210 and connected to the internal surface of the upper end portion of the hollow portion 210.

For example, the first tether 220 connected to the release device 300 may penetrate the internal surface of the lower end portion of the hollow portion 210 while crossing the interior of the lower body protection portion 200b of the lower portion of the airbag cushion 200 and the interior of the upper body protection portion 200a connected thereto, and the first tether 220 may be sewn on the internal surface of the lower end portion of the hollow portion 210.

The first tether 220 penetrating the lower end portion of the hollow portion 210 may be sewn to the internal surface of the upper end portion of the hollow portion 210 while obliquely crossing the hollow portion 210 in the direction toward the head portion of the passenger.

Furthermore, first and second end portions of the second tether 230 may be respectively connected to the internal surfaces of the front and rear end portions of the hollow portion 210.

That is, the first end portion of the second tether 230 may be sewn to the internal surface of the front end portion of the hollow portion 210, and the second end portion of the second tether 230 may be sewn to the internal surface of the rear end portion of the hollow portion 210 while being nearly horizontally connected in a direction toward the chest portion of the passenger.

Furthermore, the third tether 240 may have a first end portion connected to the lower end portion of the first tether 220 and a second end portion connected to the internal surface of the rear of the lower body protection portion 200b.

For example, the first end portion of the third tether 240 may be sewn to the portion where the first tether 220 and the diffuser 270 are connected, and the second end portion of the third tether 240 may be sewn to the internal surface of the lower body protection portion 200b while being nearly horizontally connected in a direction toward the knee portion of the passenger.

Furthermore, a diffuser 270 may be connected between the first end portion of the first tether 220 and the release device 300.

That is, when the first tether 220 is not released depending on the body shape of the passenger, as shown in FIG. 7, since the first tether 220 is maintained in a fixed and tightened state, the deployment shape of the airbag cushion 200 may be formed to be relatively small, and as gas discharged from the inflator 120 collides with the middle portion of the diffuser 270, the gas may flow along the diffuser 270 such that more gas may flow at the upper portion than the lower portion of the airbag cushion 200.

Therefore, the upper portion of the airbag cushion 200 may be deployed before the lower portion of the airbag cushion 200 such that the upward deployment speed of the airbag cushion 200 is increased at the initial airbag deployment, safely protecting the body of an adult passenger having a small body shape.

Figure 8:
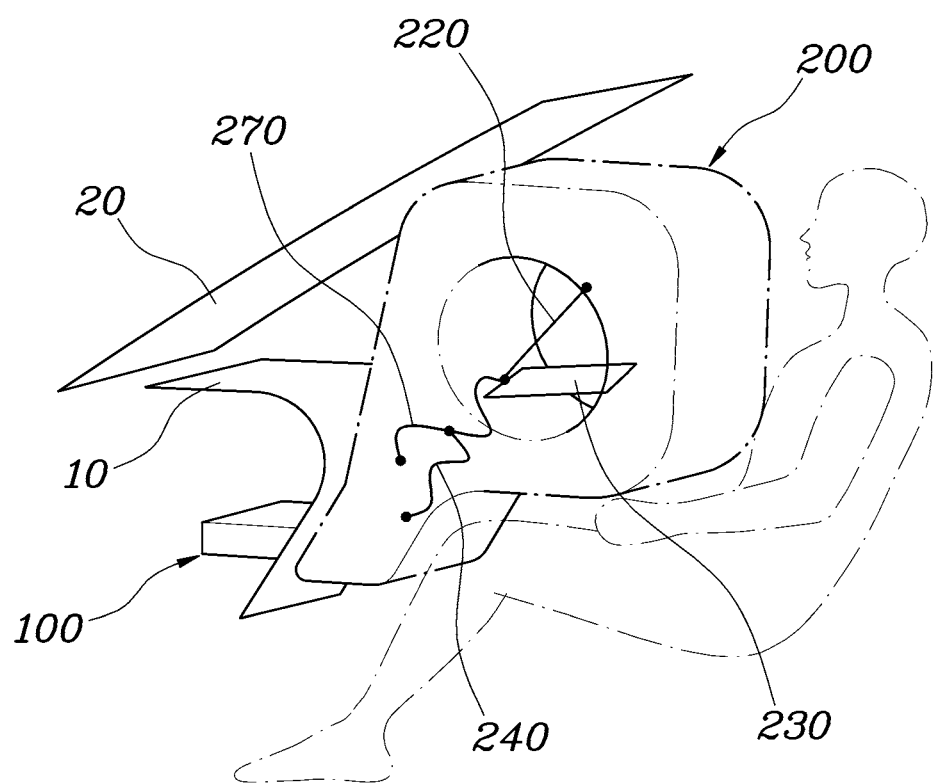
FIG. 8 is a view showing an operation in which a tether is released and deployed when the airbag cushion of FIG. 7 is deployed.

On the other hand, as shown in FIG. 8, when the first tether 220 is released depending on the body shape of the passenger, the lower end portion of the first tether 220 is loosened, and a force pulling the first tether 220 from the hollow 210 may be applied by the deployment pressure of the airbag cushion 200.

Therefore, the gas discharged from the inflator 120 may be uniformly injected forward and upward without colliding with the diffuser 270 connected to the first tether 220 such that the upper and lower portions of the airbag cushion 200 are simultaneously deployed, forming a relatively large deployment shape of the airbag cushion 200 and safely protecting the body of the adult passenger positioned relatively farther from the crash pad 10.

As shown in FIG. 7, a string-shaped connection cord 280 may be connected between the diffuser 270 and the release device 300.

For example, first end portions of two connection cords 280 may be respectively connected to both sides of the diffuser 270, and second end portions of the two connection cords 280 may be gathered to be connected to a single point of the release device 300.

That is, as the diffuser 270 and the release device 300 are connected to each other by the string-shaped connection cord 280, when the release operation of the first tether 220 is required, the first tether 220 may be released by cutting the connection cord 280, rapidly releasing the first tether 220 to improve the responsiveness of the airbag apparatus.

For example, the release device 300 may be configured to release the first tether 220 by directly cutting the first tether 220 or by cutting the connection cord 280 connected to the first tether 220.

Figure 9:
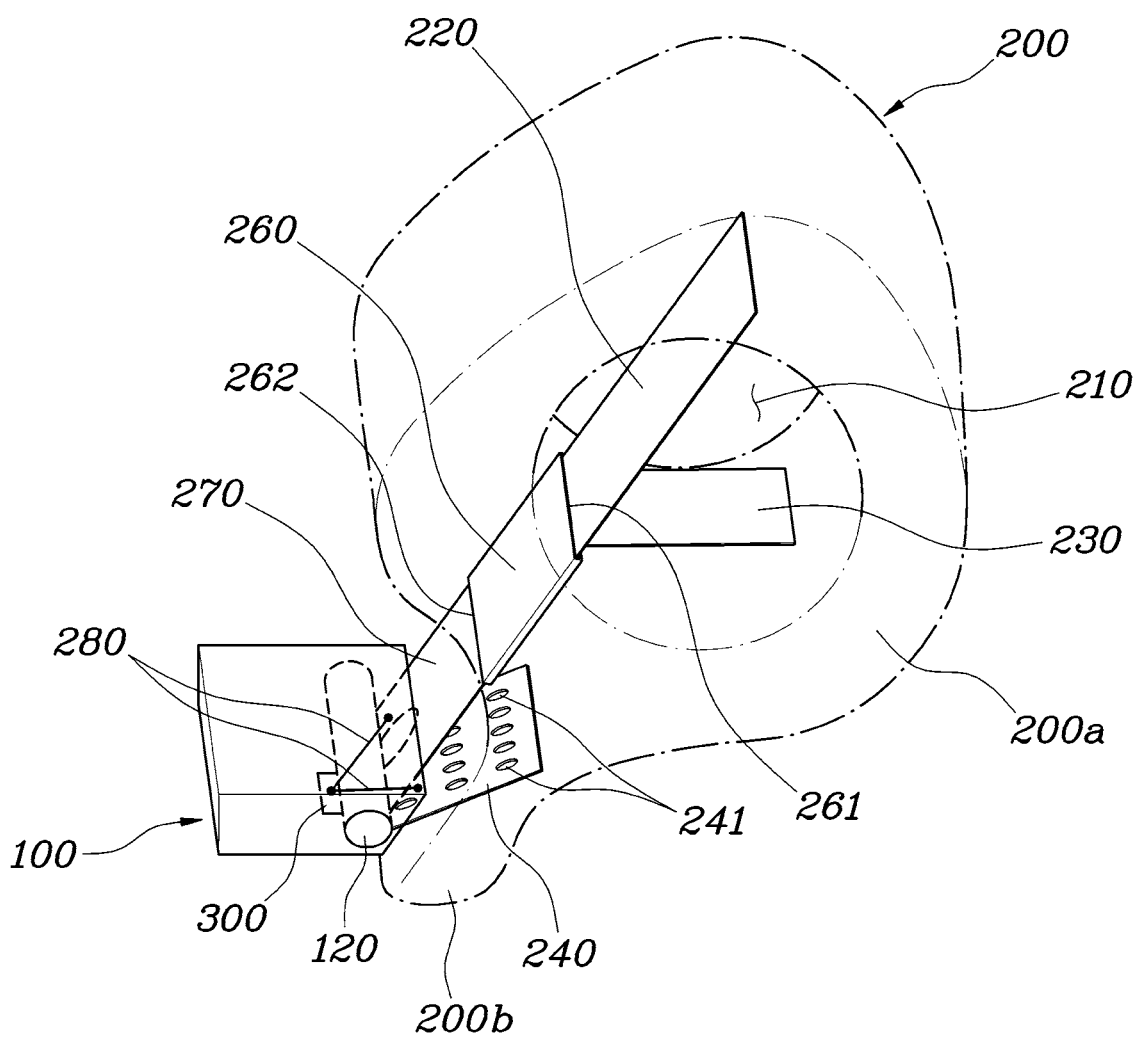
FIG. 9 is a view showing a configuration of various exemplary embodiments of the tether connection structure for deploying an airbag cushion of the present invention.

Meanwhile, FIG. 9 is a view showing a configuration of various exemplary embodiments of a tether connection structure for deploying the airbag cushion 200 of the present invention.

Referring to the drawings, according to the configuration of the various exemplary embodiments of the present invention, the first tether 220 may have a first end portion connected to the release device 300, a middle portion mounted in the hollow portion 210 by penetrating the upper body protection portion 200a, and a second end portion crossing the hollow portion 210 and connected to the internal surface of the upper end portion of the hollow portion 210.

For example, the first tether 220 connected to the release device 300 may penetrate from an interior of the lower body protection portion 200b of the lower portion of the airbag cushion 200 to an outside of the airbag cushion 200, and then the first tether 220 is provided to penetrate the upper body protection portion 200a again to penetrate out of the internal surface of the lower end portion of the hollow portion 210.

The first tether 220 penetrated out of the lower end portion of the hollow portion 210 may obliquely cross toward the head portion of the passenger in the hollow portion 210 and then may be sewn to the internal surface of the upper end portion of the hollow portion 210.

Furthermore, first and second end portions of the second tether 230 may be respectively connected to the internal surfaces of front and rear end portions of the hollow portion 210.

That is, the first end portion of the second tether 230 may be sewn to the internal surface of the front end portion of the hollow portion 210, and the second end portion of the second tether 230 may be sewn to the internal surface of the rear of the hollow portion 210 while being nearly horizontally connected in a direction toward the chest of the passenger.

Furthermore, the third tether 240 has a structure in which one end portion thereof is connected to the release device 300 and the other end portion thereof is connected to the rear internal surface of the lower body protection portion 200b.

For example, the first end portion of the third tether 240 may be connected to the release device 300, and the second end portion of the third tether 240 may be sewn to the internal surface of the lower body protection portion 200b while being connected toward in a direction toward the knee portion of the passenger.

Furthermore, referring to FIG. 9, the penetration chamber 260 may be provided in the upper body protection portion 200a in a shape surrounding the first tether 220, and guide holes 261 and 262 may be formed at upper and lower end portions of the penetration chamber 260 so that the first tether 220 is provided to penetrate the penetration chamber 260.

The upper end portion of the penetration chamber 260 is sewn to the lower end portion of the hollow portion 210 through which the first tether 220 is provided to penetrate, and the lower end portion of the penetration chamber 260 is sewn to the lower end portion of the upper body protection portion 200a through which the first tether 220 is provided to penetrate. Accordingly, the penetration chamber 260 is not in communication with the interior of the airbag cushion 200, but is in communication with the outside of the airbag cushion 200, forming a path through which the first tether 220 may be moved.

Figure 11:
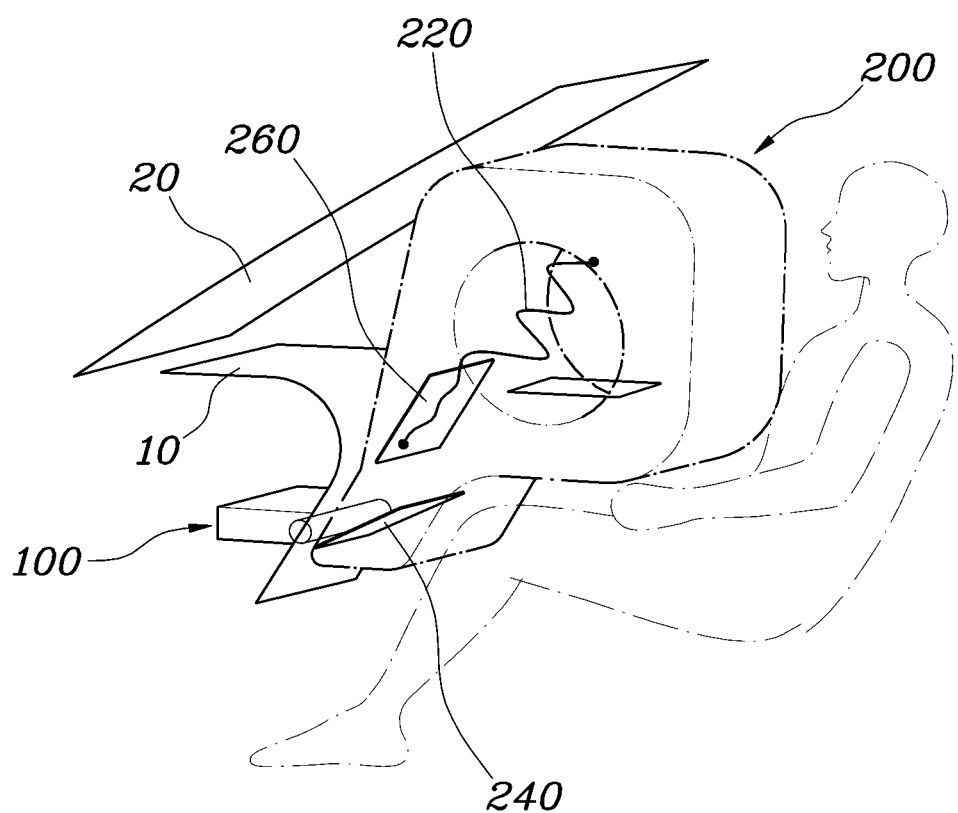
FIG. 11 is a view showing an operation in which a tether is released and deployed when the airbag cushion of FIG. 9 is deployed.

That is, the first tether 220 connected to the release device 300 is connected to the internal surface of the hollow portion 210 from the outside of the airbag cushion 200, and the path along which the first tether 220 is moved is formed through the penetration chamber 260, releasing the entire first tether 220 as shown in FIG. 11.

Therefore, when the first tether 220 is released, the first tether 220 is pulled by the deployment pressure of the airbag cushion 200 such that gas is supplied to the front of the airbag cushion 200, and as the airbag cushion 200 is deployed toward the passenger, to safely protect the body of the adult passenger positioned relatively farther from the crash pad 10.

Figure 10:
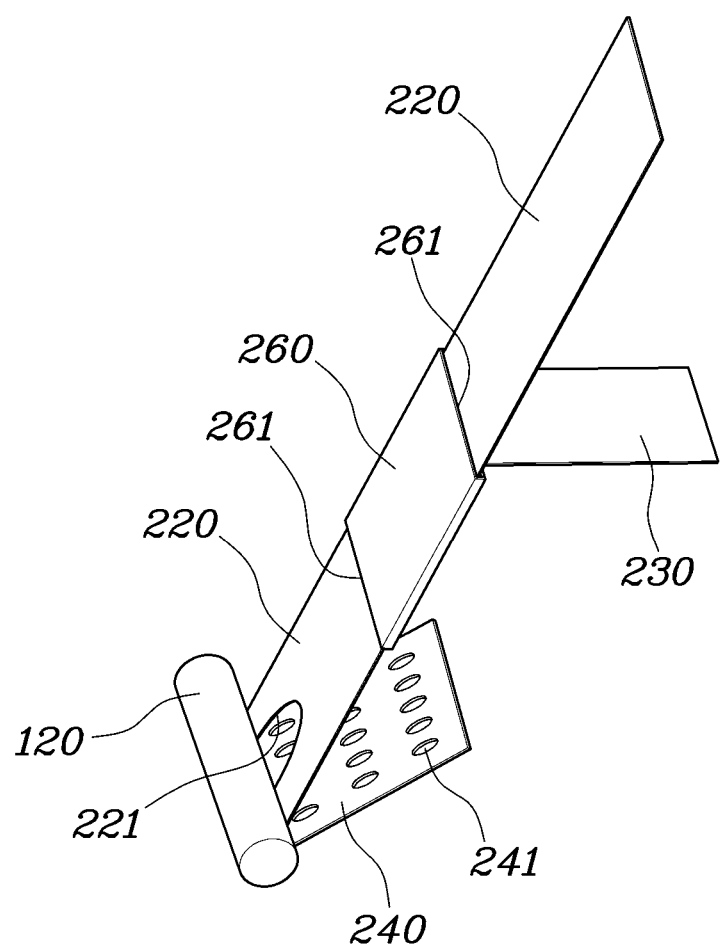
FIG. 10 is a view showing the configuration of the tether connection structure and the penetration chamber illustrated in FIG. 9.

Furthermore, FIG. 10 is a view showing the configuration of the tether connection structure of FIG. 9 and the penetration chamber 260, in which a tether vent hole 221 is formed at the first end portion of the first tether 220, and the tether vent hole 221 may be positioned in front of the gas discharging direction of the inflator 120 in the airbag cushion 200.

That is, when the first tether 220 is not released depending on the body shape of the passenger, the first tether 220 is maintained in a fixed and tightened state, and thus, the gas discharged from the inflator 120 flows into through the tether vent hole 221 such that a larger amount of gas flows at the upper portion rather than the lower portion of the airbag cushion 200.

Therefore, the upper portion of the airbag cushion 200 is deployed before the lower portion thereof at the initial airbag deployment, increasing the upward deployment speed of the airbag cushion 200, and thus safely protecting the body of an adult passenger having a small body shape.

Furthermore, as shown in FIG. 9, a string-shaped connection cord 280 may be connected between the first tether 220 and the release device 300, and between the third tether 240 and the release device 300.

For example, two first end portions of the two connection cords 280 may be connected to the first end portions of the first and third tethers 220 and 240, respectively, and two second end portions of the two connection cords 280 may be connected to the release device 300, respectively.

That is, since the first tether 220 and the release device 300 are connected to each other by the string-shaped connection cord 280 and the third tether 240 and the release device 300 are also connected to each other by the string-shaped connection cord 280, when a release operation of the first tether 220 and the third tether 240 is required, the connection cord 280 may be cut to release the first tether 220 and the third tether 240, so that the release operation of the first tether 220 may be rapidly performed to improve responsiveness of the airbag apparatus. At the same time, the first tether 220 may be separated from the third tether 240 to release an entire section of the first tether 220.

Figure 12:
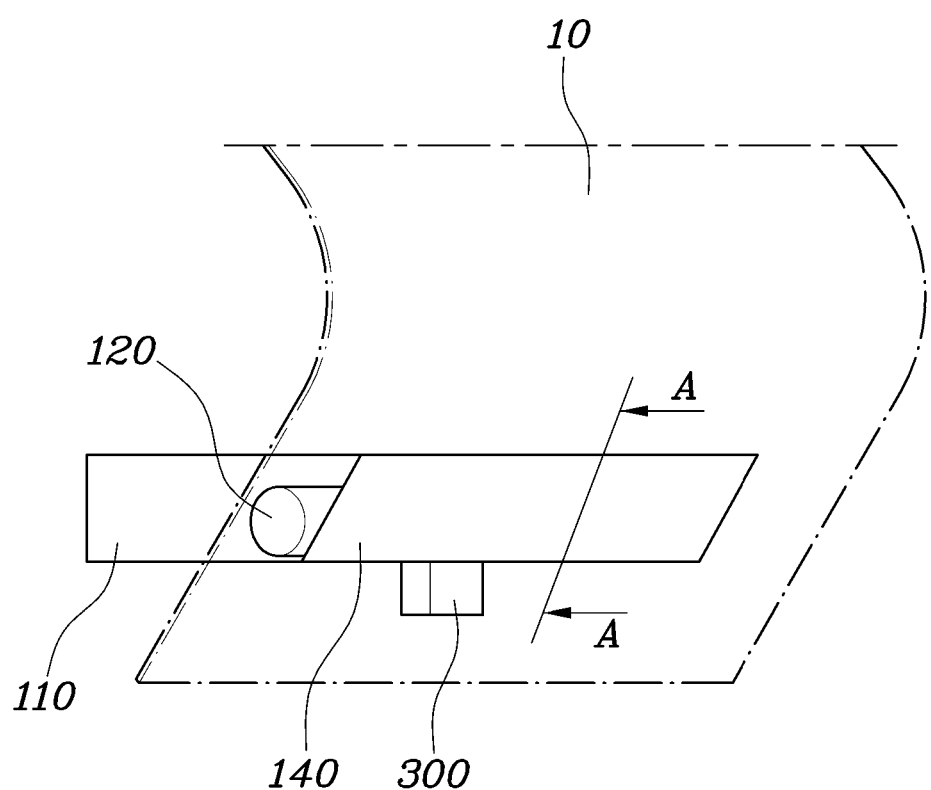
FIG. 12 is a view showing an airbag module mounted at a lower end portion of a crash pad in various exemplary embodiments of the present invention.
Figure 13:
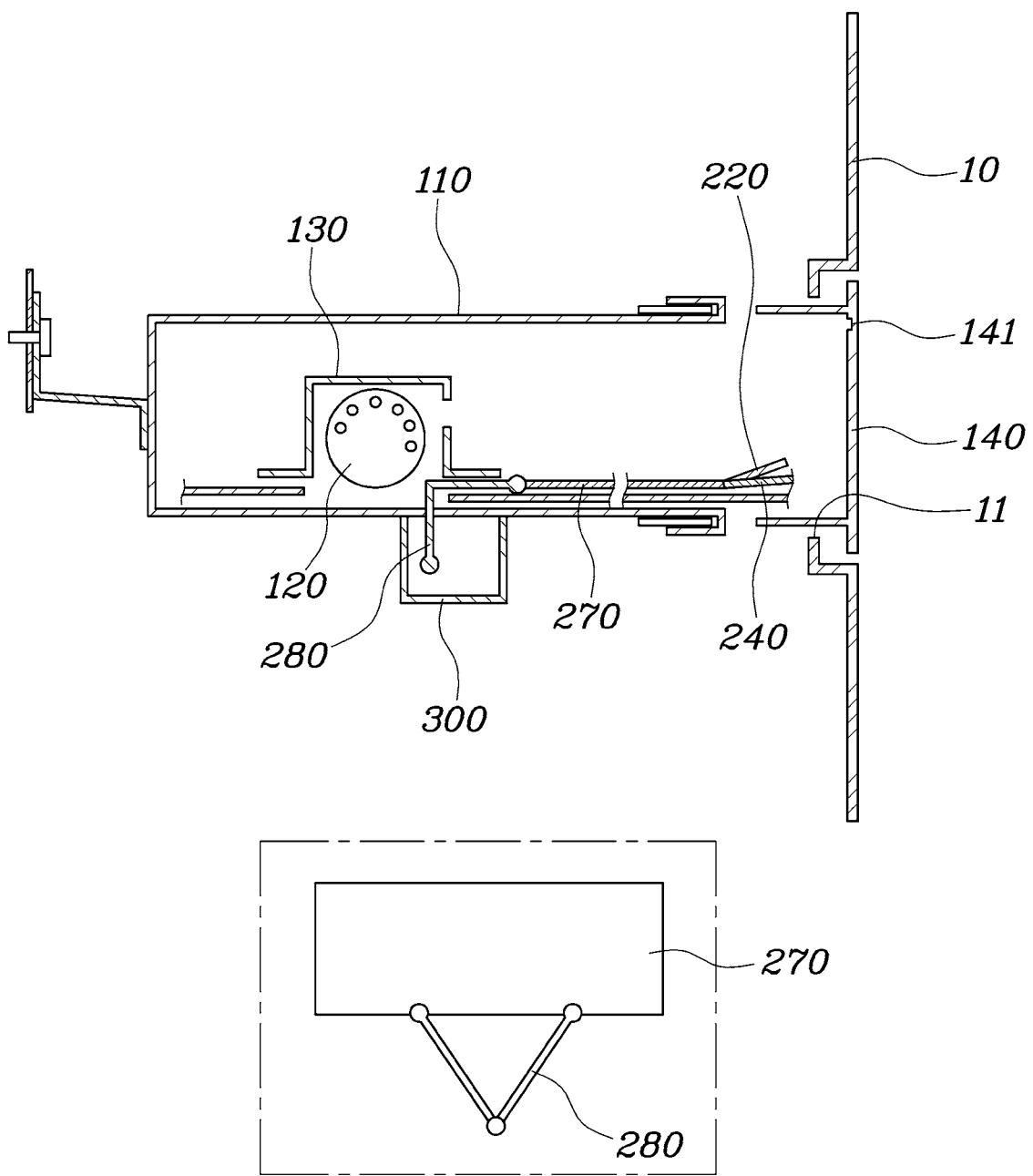
FIG. 13 is a view showing a cross-sectional structure of an airbag module and a shape in which a diffuser and a connection cord are coupled according to various exemplary embodiments of the present invention.

Meanwhile, FIG. 12 is a view showing the airbag module 100 mounted at the lower end portion of the crash pad 10 in various exemplary embodiments of the present invention, and FIG. 13 is a view showing a cross-sectional structure of the airbag module 100 and a shape in which the diffuser 270 and the connection cord 280 are coupled according to various exemplary embodiments of the present invention.

Referring to drawings, the airbag module 100 may include: an airbag housing 110 provided inside the lower end portion of a crash pad 10 and having an end portion open toward the crash pad 10; an inflator 120 provided inside the airbag housing 110 and configured to inject gas into the airbag cushion 200; and an airbag door 140 having a first end portion inserted and mounted in an airbag mounting hole 11 formed on the lower end portion of the crash pad 10 and a second end portion mounted to cover the open end portion of the airbag housing 110.

In detail, the middle portion of the airbag housing 110 may be mounted at about the knee height of the passenger on the seat and may be aligned with the middle portion of the left and right width direction of the seat.

The rear end portion of the airbag housing 110 may be modularized and mounted on a glove box panel through a bracket such that the glove box and the airbag housing 110 may be modularized and supplied to a production line.

Furthermore, the release device 300 may be mounted at the lower portion of the airbag housing 110, and the connection cord 280 connected to the release device 300 may penetrate the bottom surface of the airbag housing 110 and may be connected to the diffuser 270 or the tether.

The inflator 120 may be a cylindrical inflator 120 configured to discharge gas in a radial direction thereof, and a retainer 130 may be provided to surround the inflator 120, and a gas discharge hole may be formed at a front end portion of the retainer 130 to guide gas discharged from the inflator 120 toward the airbag door 140.

Furthermore, a tear line 141 may be formed in the left and right directions on the internal surface of the upper end portion of the airbag door 140 such that as the tear line 141 is torn by the deployment pressure of the airbag cushion 200 the airbag door 140 may be opened, and the airbag cushion 200 may be deployed through the opened airbag door 140.

The airbag cushion 200 mounted on the airbag module 100 according to various exemplary embodiments of the present invention simultaneously performs functions of an airbag for protecting the head and chest portions and a knee airbag for protecting the knee portion, integrally configuring the airbag module 100 to reduce manufacturing costs and weight and reduce the package size of the airbag module 100.

Meanwhile, referring to FIG. 1A and FIG. 1B, the airbag module may further include a controller configured to determine the body shape of a passenger on a seat and to control the release device 300 to be selectively operated according to the body shape of the passenger when the airbag cushion is deployed in a response to collision of a vehicle.

The controller may be an airbag control unit (ACU) configured for controlling the operation of the airbag, and the controller may detect weight and size of a passenger on a seat using a seat position information transfer sensor to determine the body shape of the passenger.

Upon determination of the body shape of the passenger, the tether is released when the airbag is deployed in the case of an ordinary adult male, and the tether is fixed when the airbag is deployed in the case of an adult female having a relatively small body shape. Furthermore, in the case of children passengers who have a small body shape, the tether may be controlled to be released by slightly delaying the release time point of the tether when the airbag is deployed, satisfying the LRD performance.

For example, the controller according to various exemplary embodiments of the present invention may be implemented through a non-volatile memory configured to store data related to an algorithm configured to control operations of various components of the vehicle or software instructions for reproducing the algorithm, and a processor configured to perform operations to be described below by use of the data stored in the memory. Here, the memory and the processor may be implemented as individual chips. Alternatively, the memory and the processor may be implemented as a single integrated chip. The processor may take one or more types of processors.

Figure 14:
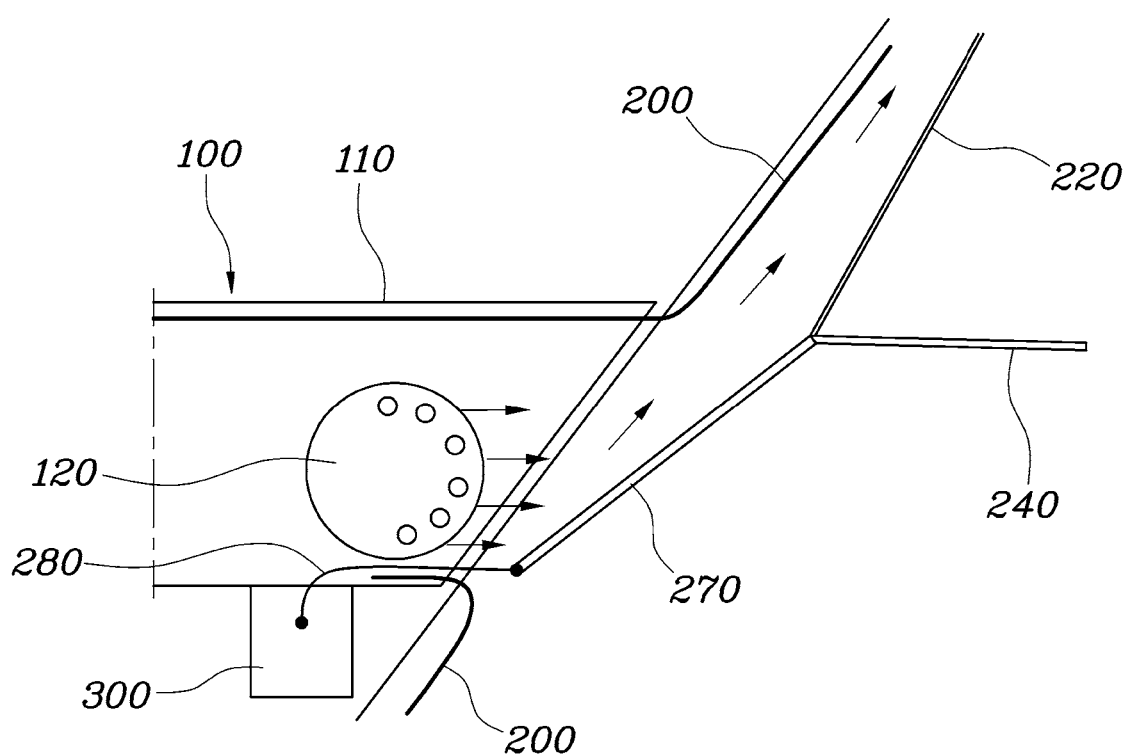
FIG. 14 is a view showing the air flow discharged from the inflator and injected into the airbag cushion of the present invention.
Figure 15:
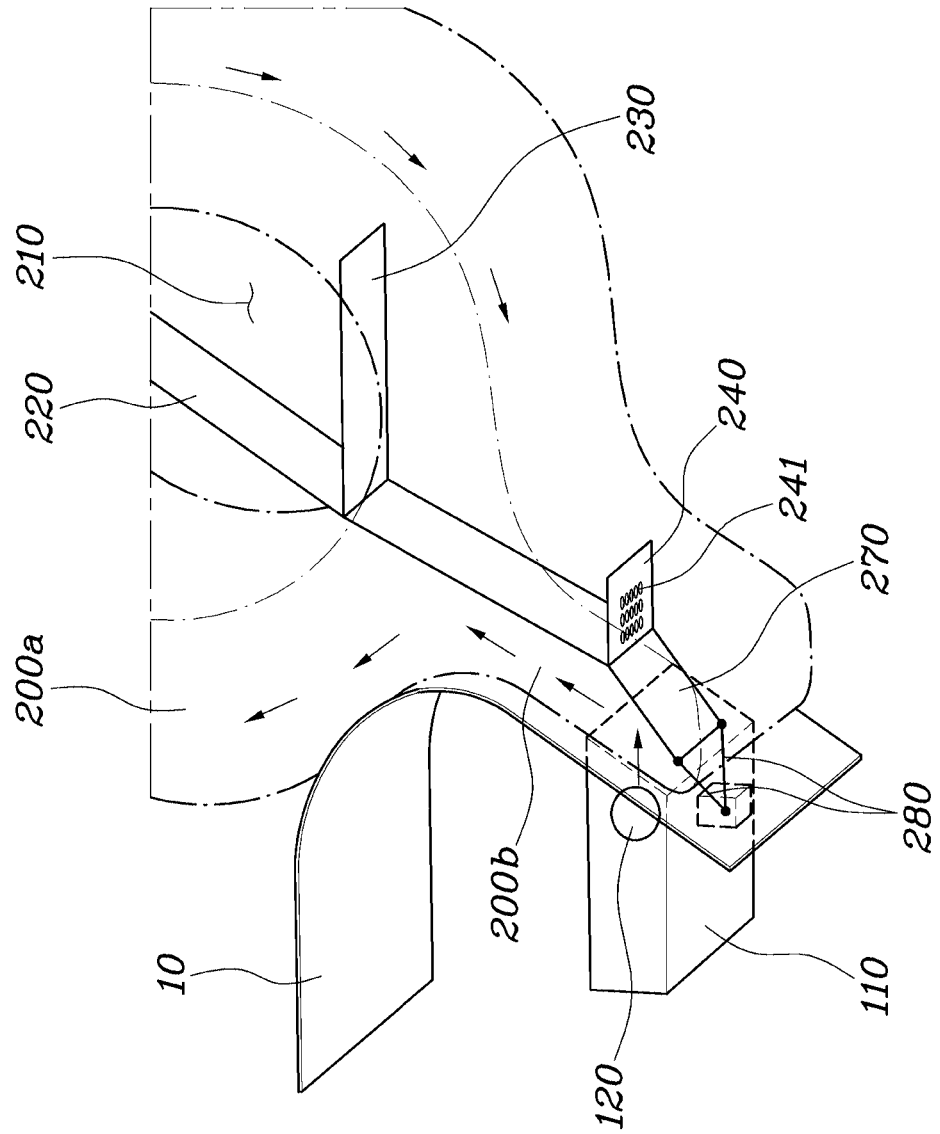
FIG. 15 is a view showing the air flow injected into the airbag cushion of the present invention.

Meanwhile, FIG. 14 is a view showing the air flow discharged from the inflator 120 in various exemplary embodiments of the present invention and injected into the airbag cushion 200, and FIG. 15 is a view showing the air flow injected into the airbag cushion 200 of the present invention.

Therefore, referring to the drawings, when the airbag cushion 200 according to various exemplary embodiments of the present invention is deployed in a response to a vehicle collision, the controller may be configured to determine a passenger positioned on a passenger seat.

Upon determination, in the case when the passenger is an adult passenger having a small body shape, gas may be discharged by operating the inflator 120 while the controller controls the release device 300 not to release the tether.

Accordingly, the airbag cushion 200 starts to be deployed while the gas discharged from the inflator 120 is injected into the airbag cushion 200, and the gas discharged from the inflator 120 collides with the diffuser 270 since the first tether 220 is not released.

Therefore, the gas flows toward the upper portion of the airbag cushion 200 along the diffuser 270, and the upper body protection portion 200*a* is deployed while the gas is flowing along the interior of the ring-shaped upper body protection portion 200*a*.

In the instant case, the amount of gas flowing toward the upper portion of the diffuser 270 is greater than the amount of gas flowing toward the rear portion of the diffuser 270, so that the upper body protection portion 200*a* of the upper portion of the airbag cushion 200 is deployed before the lower body protection portion 200*b* of the lower portion of the airbag cushion 200.

Therefore, the upward deployment speed of the airbag cushion 200 is increased at the initial airbag deployment, to rapidly restrain the head and chest portions of a passenger positioned in a front side due to a small body shape, and when the weight of the passenger is applied to the airbag cushion 200, the gas inside the airbag cushion 200 is appropriately discharged to safely protect the passenger.

Furthermore, the gas flowing from the upper body protection portion 200*a* to the lower body protection portion 200*b* flows through the through hole 241 formed in the third tether 240, and the gas flows into the lower body protection portion 200*b* through both sides of the diffuser 270 such that the lower body protection portion 200*b* is deployed at a predetermined level or more to protect the knee portion of the passenger.

Meanwhile, when an airbag is deployed in a response to a vehicle collision, in a case when a passenger having a large body shape is positioned on the seat, the controller operates the inflator 120 to discharge gas while controlling the release device 300 to release the tether.

Accordingly, the airbag cushion 200 starts to be deployed while the gas discharged from the inflator 120 is injected into the airbag cushion 200, and as the first tether 220 is released, the gas discharged from the inflator 120 uniformly flows into the airbag cushion 200, entirely deploying the airbag cushion 200.

In the instant case, as the gas is discharged toward the passenger, the passenger side direction of the airbag cushion 200 is deployed before the upper direction of the airbag cushion 200 is deployed.

Therefore, the deployment speed of the airbag cushion 200 in the passenger side direction is increased at the initial airbag deployment, to rapidly restrain the upper body and the lower body of the passenger positioned at the rear side due to the large body shape, and the passenger may be safely protected by appropriately discharging the gas inside the airbag cushion 200 when the weight of the passenger is applied to the airbag cushion 200.

As described above, according to various exemplary embodiments of the present invention, the tether may be selectively released or maintained in a fixed state depending on the body shape or seating position of the passenger in the slimmed design of the crash pad 10, so that the deployment shape the airbag cushion 200 may be changed to rapidly restrain the passenger, and thus the passenger protection area may be increased to safely protect the passenger.

Furthermore, the initial deployment pressure of the airbag cushion 200 may be reduced by the structure of the diffuser 270 and by controlling the release time point of the tether, improving the LRD performance.

Moreover, manufacturing costs and weight of the airbag module 100 may be reduced and the package of the airbag module 100 may be reduced by simultaneously performing configured for protecting head, chest, and knee portions of the passenger using a single integrated airbag module 100.

Furthermore, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An airbag apparatus comprising:
   an airbag module disposed at a lower end portion of a crash pad;
   an airbag cushion configured to deploy from the airbag module to deploy in a space between a first position and a second position disposed higher than the first position in a vehicle wherein a tether is connected to the airbag cushion in a deployment direction of the airbag cushion toward at least one of the first position, a third position, and the second position in the vehicle to form an integrated deployment shape, the third position disposed between the first position and the second positon in a height direction of the vehicle; and
   a release device connected to the tether adjacent to the airbag module, and operated to allow the tether to be released or maintained,
   wherein the airbag cushion includes a hollow portion at a middle portion of the airbag cushion in left and right directions of the vehicle, an upper body protection portion and a lower body protection portion,
   wherein the upper body protection portion of the airbag cushion is deployed in an annular shape enclosing the hollow portion, and the lower body protection portion of the airbag cushion is deployed downwardly from a front end portion of the upper body protection portion, and
   wherein the tether includes:
   a first tether connected between the release device and the hollow portion toward the second position;
   a second tether connected in the hollow portion toward the third position; and
   a third tether connected in the lower body protection portion toward the first position.

2. The airbag apparatus of claim 1,
   wherein the first position, the second position and the third position are a knee portion, a head portion and a chest portion of a passenger, and
   wherein the release device is configured to be operated to allow the tether to be released or maintained in a fixed state in a deployment process of the airbag cushion depending on a body shape of the passenger on a seat of the vehicle.

3. The airbag apparatus of claim 2, wherein the airbag module further includes:
a controller connected to the release device and configured to determine the body shape of the passenger on the seat and to control the release device to selectively operate depending on the body shape of the passenger when the airbag cushion is deployed in a response to collision of the vehicle.

4. The airbag apparatus of claim 1,
wherein the first tether has a first end portion connected to the release device, a middle portion penetrating a lower end portion of the hollow portion and crossing an interior of the airbag cushion, and a second end portion crossing the hollow portion to be connected to an internal surface of an upper end portion of the hollow portion;
wherein the second tether has a first end portion and a second end portion connected to internal surfaces of front and rear end portions of the hollow portion, respectively; and
wherein the third tether has a first end portion connected to a lower end portion of the first tether and a second end portion connected to an internal surface of a rear of the lower body protection portion.

5. The airbag apparatus of claim 4,
wherein a vent chamber is provided in the airbag cushion and formed to surround the first tether,
wherein upper and lower vent holes are respectively formed at upper and lower end portions of the vent chamber to allow the first tether to penetrate the vent chamber, and
wherein a cross-section of the first end portion of the first tether is greater than a cross-section of the lower vent hole so that the first end portion of the first tether is hung on the lower vent hole while the first tether is released.

6. The airbag apparatus of claim 5, wherein a diffuser having a lateral distance longer than a lateral distance of the lower vent hole is connected between the first end portion of the first tether and the release device so that the diffuser is hung on the lower vent hole while the first tether is released.

7. The airbag apparatus of claim 6,
wherein the first tether is provided to penetrate the lower end portion of the hollow portion,
wherein the upper end portion of the vent chamber is sewn to the lower end portion of the hollow portion through which the first tether is provided to penetrate so that the upper vent hole fluidically-communicates with an interior of the hollow portion, and
wherein the lower end portion of the vent chamber is sewn to an internal surface of the airbag cushion so that the lower vent hole fluidically-communicates with the interior of the airbag cushion.

8. The airbag apparatus of claim 1, wherein at least a through hole is formed on the third tether.

9. The airbag apparatus of claim 1,
wherein the first tether has a first end portion connected to the release device, a middle portion penetrating and fixed to a lower end portion of the hollow portion and crossing an interior of the airbag cushion, and a second end portion crossing the hollow portion to be connected to an internal surface of an upper end portion of the hollow portion;
wherein the second tether has a first end portion and a second end portion connected to internal surfaces of front and rear end portions of the hollow portion, respectively; and
wherein the third tether has a first end portion connected to a lower end portion of the first tether and a second end portion connected to an internal surface of a rear of the lower body protection portion.

10. The airbag apparatus of claim 9, wherein a diffuser is connected between the first end portion of the first tether and the release device.

11. The airbag apparatus of claim 1,
wherein the first tether has a first end portion connected to the release device, a middle portion disposed inside the hollow portion by penetrating the upper body protection portion, and a second end portion crossing the hollow portion to be connected to an internal surface of an upper end portion of the hollow portion;
wherein the second tether has a first end portion and a second end portion connected to internal surfaces of front and rear end portions of the hollow portion, respectively; and
wherein the third tether has a first end portion connected to the release device and a second end portion connected to an internal surface of a rear of the lower body protection portion.

12. The airbag apparatus of claim 11,
wherein a penetration chamber is provided in the upper body protection portion to surround the first tether,
wherein an upper end portion of the penetration chamber is sewn to a lower end portion of the hollow portion through which the first tether is provided to penetrate, and
wherein a lower end portion of the penetration chamber is sewn to a lower end portion of the upper body protection portion through which the first tether is provided to penetrate.

13. The airbag apparatus of claim 11,
wherein a tether vent hole is formed at the first end portion of the first tether, and
wherein the tether vent hole is disposed in a front of a gas discharging direction of an inflator of the airbag cushion.

14. The airbag apparatus of claim 9, wherein a connection cord is connected between the first tether and the release device or between the third tether and the release device.

15. The airbag apparatus of claim 14,
wherein the connection cord includes a first connection cord and a second connection cord,
wherein first end portions of the first and second connection cords are connected to first and second sides of a diffuser, respectively, and second end portions of the first and second connection cords are connected to a single point of the release device.

16. The airbag apparatus of claim 14,
wherein the connection cord includes a first connection cord and a second connection cord, and
wherein first end portions of the first and second connection cords is connected to the first end portions of the first and third tethers, respectively, and second end portions of the first and second connection cords are connected to the release device, respectively.

17. The airbag apparatus of claim 1, wherein the airbag module further includes:
an airbag housing provided inside the lower end portion of the crash pad and having an end portion open toward the crash pad;

an inflator provided inside the airbag housing and configured to inject gas into the airbag cushion; and an airbag door having a first end portion inserted and mounted in an airbag mounting hole formed on the lower end portion of the crash pad and a second end portion mounted to cover the end portion of the airbag housing open toward the crash pad.

18. The airbag apparatus of claim 1, wherein the airbag module further includes:

a controller connected to the release device and configured to control the release device to selectively operate when the airbag cushion is deployed in a response to collision of the vehicle.

\* \* \* \* \*